2,335,323
ELECTRICAL APPARATUS AND MACHINES FOR PROTECTION AGAINST FIRE AND EXPLOSION HAZARDS
Urban Molin, Lidingo, Sweden, assignor to Aktiebolaget W. Dan Bergman, Sodertalje, Sweden
Filed Mar. 29, 1965, Ser. No. 443,234
5 Claims. (Cl. 317—13)

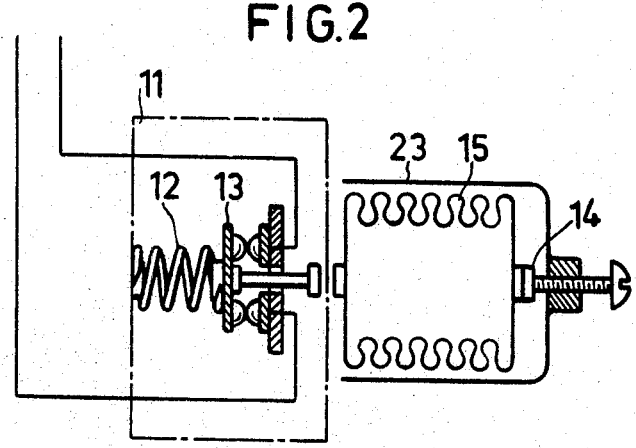

ABSTRACT OF THE DISCLOSURE

An electrical apparatus is provided with a relatively gas-tight housing and an internal supply of inert gas under pressure that is slowly liberated in the housing to exclude possibly inflammable gas and also with means for interrupting the supply of electrical current to the apparatus if the pressure of inert gas within the housing falls below a predetermined value.

---

Figure 1:
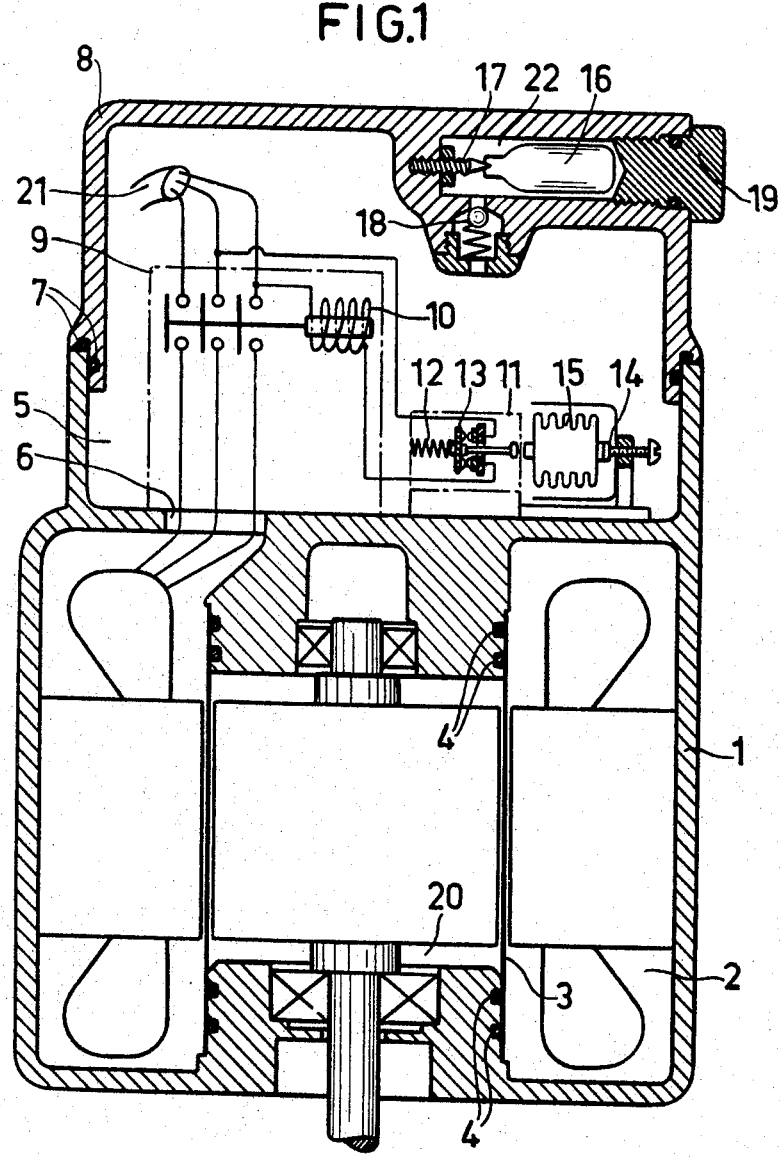

This invention relates to electrical apparatus and machines which are destined for use where fire and explosion hazards are encountered, such as petrol plants, gasworks, coal mines, or the like, and which have to conform to technical regulations issued by government authorities or insurance companies with a view of obviating such incendiary or explosion hazards. Although differing substantially between different countries, these regulations specify in most cases the design of fixed or movable seals, the particular design of dismountable assemblies, etc., in order to eliminate the possibility of inflammable ambient gas mixtures penetrating into spaces where electrical components are present, and where, owing to the operation of contact means, or the rupture of conductors such as caused by overheating and burning out, sparks may be generated. If an inflammable gas has leaked through, the sparks may cause an internal explosion in the apparatus or machine, and the regulations in many countries also specify strength tests to ensure that pressure rise by internal explosions will not result in the ripping open of the apparatus or machine housing which might lead to the explosion being spread to the surrounding space.

Another known way of eliminating fire hazards is to fill a charge of pressurized inert gas into the apparatus or machine which will prevent any inflammable ambient gas from entering as long as the pressure remains. This measure has not become widely used, at least for electrical motors, due to the fact that at least in one point, where the motor shaft passes through the motor housing, the shaft seal will not be able to prevent a rapid pressure equalization through leakage.

It is the chief object of the present invention to provide an electrical apparatus or machine having its interior sealed against the ambient atmosphere and filled with a pressurized gas, wherein according to the invention pressure-sensitive means disposed within said apparatus or machine is adapted to break the electrical connection between the apparatus or machine and an outside current source when the gas pressure sinks to a predetermined value.

The invention is illustrated by way of example in the drawings.

FIG. 1 is an axial section view of an electrical motor provided for a submersible pump, and FIG. 2 illustrates on a greater scale a portion of FIG. 1.

In the drawing numeral 1 denotes the pump housing and 2 the chamber for the stator of the electrical motor. Said stator chamber is shut off from the rotor chamber 20 by a thin-walled cylindrical sleeve 3 that is sealingly connected to the pump housing by means of O-rings 4.

The stator chamber 2 communicates through an aperture 6 with the chamber 5 which holds the contactor and circuit breaker 9. Conductors supplying current to the stator pass through the aperture 6. The chamber 5 is sealed off from the ambient atmosphere by means of O-rings 7 disposed between a cover 8 and the pump housing 1. The electrical cable 21 connecting the pump motor to a source of current is passed through the outer wall of the chamber 5 by means of a gas-tight sleeve (not illustrated) in a manner known in itself. Thus, the spaces receiving electrical parts have been completely sealed off from the ambient atmosphere by use of stationary sealing means, only. The motor is of the induction type, and its rotor chamber consequently only holds parts of a purely mechanical character.

Switching on and off the motor is effected by means of the electromagnetic contactor 9 which starts the motor when its solenoid 10 is energized. A switch 11 is connected in series with the solenoid 10. A compression spring 12 urges the switch towards circuit-closing position. Between the contact bridge 13 of the switch 11 and an adjustable abutment 14, a closed barometric metal capsule 15 is disposed. The spring rate of the capsule is chosen in such a way that at equal inner and outer pressure the capsule assumes a length corresponding to open position of the switch 11, the compression force of spring 12 being overpowered. The capsule 15 is preferably enclosed in a housing 23 which may serve as a guide therefor.

The inner "electrical" spaces of the pump are charged with an inert gas, such as carbon dioxide, from a condensed gas cartridge 16 which may be of a type common in the market and intended for use in soda siphons. It is inserted into a chamber 22, and is pierced through in a known manner by being urged towards a fixed spike 17 by means of a threaded plug 19 engaging internal threads in the mouth of chamber 22, the gas opening by its elevated pressure the spring-loaded valve 18 and flowing into the pump interior. Gas leakage to the ambient atmosphere is prevented by sealing means such as an O-ring between the plug and the surrounding wall. The pressure rise will cause compression of the capsule 15, and the switch 11 is closed. The pump will now be ready for use. With the charge of carbon dioxide held by the cartridge, about 8.3 grammes, a pressure of several atmospheres will be attained within the "electrical" space of the pump, this space having a volume of the order of one litre in current pump types. A completely gas-tight seal will never be possible, and some small leakage must always be accepted, the leakage rate being dependent on the quality of the seals. When the internal pressure sinks to a predetermined value, which is set by means of the adjustable abutment 14, the capsule 15 expands so far that the switch 11 breaks off the current to the solenoid 10 by its contact bridge 13 being moved away from the contacts. This movement is preferably made instantaneous by the use of means well known in themselves (not illustrated) to avoid the forming of electric arcs between the bridge and the contacts and repeated actuations of the contactor 9. If, for any reason, the capsule becomes leaky the spring rate thereof will cause at once opening of the switch 11. The same safety is incorporated in the spring 12. If it ruptures the switch 11 opens.

The check valve 18 prevents gas from flowing from the pump housing to the ambient atmosphere during the recharging period, i.e. when the plug 19 is removed for exchange of the cartridge for a fresh one.

Instead of the cartridge 16 an outside source of pressurized gas may be used for raising the pressure inside the pump housing. Thus, compressed air may be charged into the pump by connecting an ordinary compressed air line to the charging chamber 22, preferably by use of the threaded plug 19.

If the length of the periods between consecutive recharges is recorded, the state of the seals may be readily adjudged, and a pump tending to be deficient in that respect may be withdrawn from operation for maintenance.

The safety device according to the invention involves, of course, no hindrance for the provision of a mechanical structure of a kind apt to comply with safety regulations, such as a particular shape of all assembling screws to prevent the latter from being undone with ordinary tools, as well as such a strong design of the pump and contactor housings and the stator sleeve that they are able to withstand an internal explosion.

What I claim is:

1. An apparatus comprising a short-circuited electric motor which has at least its stator chamber sealed off from the ambient atmosphere, a charging chamber connected by a passage to the interior of said stator chamber, a spring-loaded check valve positioned normally to shut off said passage, means for charging said charging chamber with gas under pressure and a pressure-sensitive means within said stator chamber adapted to break off electrical connection between said electric motor and an outer source of electric current when the gas pressure in said stator chamber sinks to a predetermined pressure.

2. An apparatus as claimed in claim 1, wherein said charging chamber is shaped for receiving a condensed gas cartridge, and is formed at its open end portion with internal threads for receiving externally threaded means adapted, upon tightening, to puncture said cartridge against spike means projecting into said charging chamber.

3. An apparatus as claimed in claim 2, wherein means are provided for presetting the pressure at which the electrical connection is broken.

4. An apparatus as claimed in claim 3, wherein said perssure sensitive means comprises a body, with resiliently variable external characteristics sensitive to external pressure.

5. An apparatus as claimed in claim 4, wherein the dimensions and resilience characteristics of said body are chosen in such a way that the body will assume a state corresponding to a broken electrical connection if it becomes damaged in a manner to be insensible to the external pressure.

References Cited
UNITED STATES PATENTS

| | | | |
|---|---|---|---|
| 1,670,697 | 5/1928 | Treanor | 317—15 |
| 1,899,746 | 2/1933 | Brown | 317—14 |
| 2,475,343 | 7/1949 | Wellman. | |
| 3,237,848 | 3/1966 | Pihl et al. | 318—481 X |

MILTON O. HIRSHFIELD, *Primary Examiner.*

J. D. TRAMMELL, *Assistant Examiner.*